US012777421B2

(12) United States Patent
Zhang et al.

(10) Patent No.: US 12,777,421 B2
(45) Date of Patent: Oct. 27, 2026

(54) METHOD FOR INFORMATION TRANSMISSION, COMMUNICATION APPARATUS, AND STORAGE MEDIUM

(71) Applicant: BEIJING UNISOC COMMUNICATIONS TECHNOLOGY CO., LTD., Beijing (CN)

(72) Inventors: Xiangdong Zhang, Beijing (CN); Chunyan Cao, Beijing (CN)

(73) Assignee: BEIJING UNISOC COMMUNICATIONS TECHNOLOGY CO., LTD., Beijing (CN)

( * ) Notice: Subject to any disclaimer, the term of this patent is extended or adjusted under 35 U.S.C. 154(b) by 304 days.

(21) Appl. No.: 18/686,240

(22) PCT Filed: Aug. 9, 2022

(86) PCT No.: PCT/CN2022/111139
§ 371 (c)(1),
(2) Date: Feb. 23, 2024

(87) PCT Pub. No.: WO2023/024896
PCT Pub. Date: Mar. 2, 2023

(65) Prior Publication Data
US 2025/0193794 A1 Jun. 12, 2025

(30) Foreign Application Priority Data
Aug. 25, 2021 (CN) ........................ 202110986255.X

(51) Int. Cl.
*H04W 52/02* (2009.01)
*H04W 68/00* (2009.01)

(52) U.S. Cl.
CPC ....... *H04W 52/0235* (2013.01); *H04W 68/00* (2013.01)

(58) Field of Classification Search
CPC .......................... H04W 52/0235; H04W 68/00
(Continued)

(56) References Cited

U.S. PATENT DOCUMENTS 11,252,665 B2 * 2/2022 Chen ................ H04W 52/0235
2008/0070595 A1 3/2008 Willey
(Continued)

FOREIGN PATENT DOCUMENTS

CN 101132540 A 2/2008
CN 107431982 A 12/2017
(Continued)

OTHER PUBLICATIONS

CATT, "Paging enhancement for UE power saving", 3GPP TSG RAN WG1 #105-e R1-2104532, dated May 19-27, 2021.
(Continued)

*Primary Examiner* — Qutbuddin Ghulamali
(74) *Attorney, Agent, or Firm* — HAUPTMAN HAM, LLP

(57) ABSTRACT

A method for information transmission, a communication apparatus, and a storage medium are provided in the disclosure. The method for information transmission includes: receiving a wake-up message; and determining a first identification information according to the wake-up message, the first identification information being all or part of terminal identification information.

16 Claims, 5 Drawing Sheets

(58) Field of Classification Search
USPC .......................................................... 455/574
See application file for complete search history.

(56) References Cited

U.S. PATENT DOCUMENTS

| | | | | |
|---|---|---|---|---|
| 2008/0070597 | A1 | 3/2008 | Willey | |
| 2010/0173651 | A1 | 7/2010 | Park et al. | |
| 2020/0178176 | A1* | 6/2020 | Kim | H04W 52/0216 |
| 2020/0205076 | A1* | 6/2020 | Chen | H04W 52/02 |
| 2023/0309060 | A1* | 9/2023 | Xu | H04W 52/0216 |

FOREIGN PATENT DOCUMENTS

| | | | |
|---|---|---|---|
| CN | 108966322 | A | 12/2018 |
| CN | 109429174 | A | 3/2019 |
| CN | 109565694 | A | 4/2019 |
| CN | 109936868 | A | 6/2019 |
| CN | 109937594 | A | 6/2019 |
| CN | 111132280 | A | 5/2020 |
| WO | 2021098061 | A1 | 5/2021 |

OTHER PUBLICATIONS

WIPO, International Search Report for International Application No. PCT/CN2022/111139, Nov. 11, 2022.

First Office Action issued in corresponding CN application No. 202110986255.X dated Apr. 25, 2025.

Second Office Action issued in corresponding CN application No. 202110986255.X dated Sep. 6, 2025.

Tan Qinhong et al., "Denial of service attack based on cracking IMSI", Journal of Nanjing University of Posts and Telecommunications (Natural Science Edition), dated Jun. 2020.

Ericsson "Wake-up signal configurations and procedures for Nb-Iot" 3GPP TSG-RAN WG1 Meeting #92 R1-1804153, dated Apr. 16-20, 2018.

Notification of grant of patent right for invention issued in corresponding CN application No. 202110986255.X dated Jan. 9, 2026.

* cited by examiner

METHOD FOR INFORMATION TRANSMISSION, COMMUNICATION APPARATUS, AND STORAGE MEDIUM

CROSS-REFERENCE TO RELATED APPLICATION(S)

This application is a National Stage of International Application No. PCT/CN2022/111139, field Aug. 9, 2022, which claims priority to Chinese Patent Application No. 202110986255.X, filed Aug. 25, 2021, the entire disclosures of which are hereby incorporated by reference.

TECHNICAL FIELD

This application relates to the field of communication technology, and particularly to a method for information transmission, a communication apparatus, and a storage medium.

BACKGROUND

Currently, when a terminal device is in deep sleep, the terminal device can monitor a wake-up message through a low power waking up radio (LP-WUR). Upon monitoring the wake-up message through the LP-WUR circuit, a primary circuit of the terminal device is woken up to monitor a paging message through the primary circuit, so as to determine whether to be paged. As such, a standby power consumption of the terminal device can be reduced effectively.

However, this wake-up message is generally only used to wake up the primary circuit, and therefore, how to use the wake-up message more effectively has become a hot issue in current research.

SUMMARY

In a first aspect, the disclosure provides a method for information transmission. The method includes: receiving a wake-up message; and determining a first identification information according to the wake-up message, the first identification information being all or part of terminal identification information.

In a second aspect, the disclosure provides a communication apparatus. The communication apparatus includes a transceiver, a processor, and a memory. The processor is in communication connection with the transceiver. The memory is in communication connection with the processor and stores instructions executable by the processor. The instructions, when executed by the processor, are operable with the processor to execute the method in the first aspect.

In a third aspect, the disclosure provides a non-transitory computer-readable storage medium. The non-transitory computer-readable storage medium stores instructions which, when executed by a processor, cause the processor to execute the method in the first aspect.

BRIEF DESCRIPTION OF THE DRAWINGS

In order to describe technical solutions of implementations of the disclosure more clearly, the following will give a brief description of accompanying drawings used for describing the implementations. Apparently, accompanying drawings described below are merely some implementations. Those of ordinary skill in the art can also obtain other accompanying drawings based on the accompanying drawings described below without creative efforts.

DETAILED DESCRIPTION

Hereinafter, technical solutions of implementations of the disclosure will be described clearly and completely with reference to accompanying drawings in the implementations of the disclosure. Apparently, implementations described below are merely some implementations, rather than all implementations, of the disclosure. All other implementations obtained by those of ordinary skill in the art based on the implementations of the disclosure without creative efforts shall fall within the protection scope of the disclosure.

To facilitate understanding, terminologies involved in the disclosure are first introduced.

1. Low Power Waking Up Radio (LP-WUR)

Figure 1:
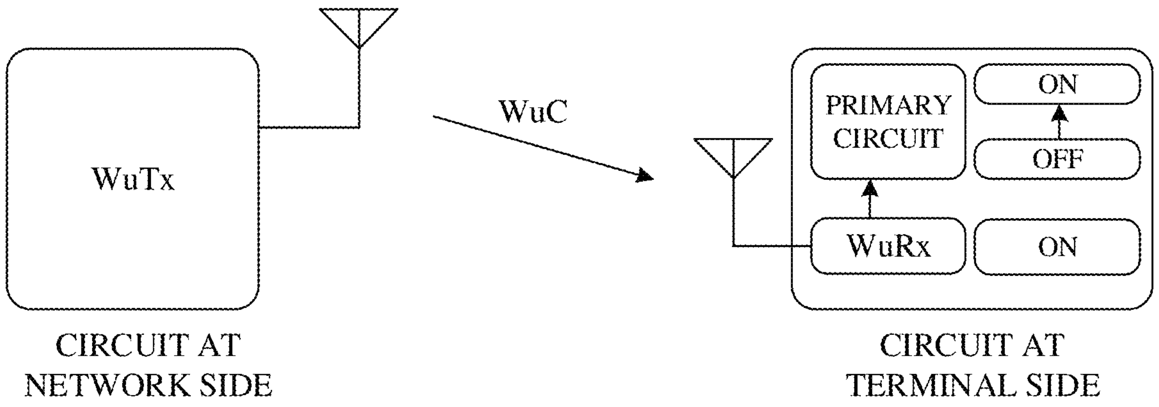
FIG. 1 is a schematic diagram illustrating a low power waking up radio (LP-WUR) provided in implementations of the disclosure.

Referring to FIG. 1, FIG. 1 is a schematic diagram illustrating LP-WUR. As can be seen from FIG. 1, a circuit on the left is a circuit of a network device and configured to send a wake-up message; a circuit on the right is a circuit of a terminal device and configured to receive the wake-up message. WuTx is a sending end for WuC, WuRx is a receiving end for WuC, and WuC is the wake-up message. It is to be noted that, a circuit to which WuRx belongs is LP-WUR.

It is to be noted that, WuRx may be powered on periodically to monitor a WuC message. Optionally, WuRx may also be on for a long time to continuously monitor the WuC message. After WuRx receives the WuC message, wake up a primary circuit, that is, turn on the primary circuit, and further monitor and receive a paging message through the primary circuit.

As such, a standby power consumption of the terminal device can be reduced effectively, so that a standby time of the terminal device can be prolonged, thereby improving user experience.

Figure 2:
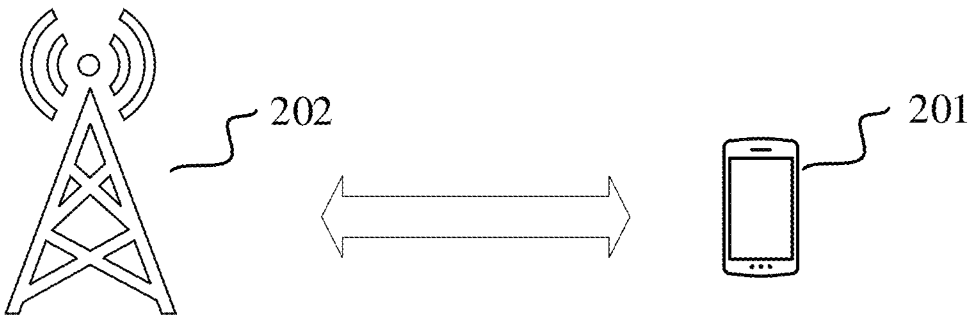
FIG. 2 is an architecture diagram illustrating a communication system provided in implementations of the disclosure.

Referring to FIG. 2, FIG. 2 is an architecture diagram illustrating a communication system provided in implementations of the disclosure. As illustrated in FIG. 2, the communication system includes a terminal device 201 and a network device 202.

The terminal device 201 may be a terminal device that receives a wake-up message, where the wake-up message carries first identification information. Optionally, the terminal device 201 may also be a terminal device that receives a first paging message, where the first paging message carries second identification information.

The network device 202 may be a network device corresponding to a serving cell where the terminal device 201 is located. Optionally, the network device 202 can send a wake-up message to all terminal devices in the serving cell. After receiving the wake-up message, the terminal device(s) will determine whether to wake up its own primary circuit. Optionally, the network device 202 can also send a first paging message to a terminal device whose primary circuit is awakened. After receiving the first paging message, the terminal device whose primary circuit is awakened will determine whether to be paged.

It can be understood that, the terminal device 201 can receive the wake-up message, and determine whether to wake up its own primary circuit according to the first identification information carried in the wake-up message. There may be multiple terminal devices whose primary circuit needs to be woken up, and the multiple terminal devices include the terminal device 201. It is to be noted that, the number (i.e., quantity, how many) of terminal devices and the number of network devices in FIG. 2 is merely illustrative, which is not limited in the disclosure.

The terminal device herein is an entity at a user side that is used to receive or transmit a signal, such as a mobile phone. The terminal device can also be called terminal, user equipment (UE), mobile station (MS), mobile terminal (MT), etc. The terminal device may be a mobile phone, a wearable device, a tablet computer (Pad), a computer with a wireless transceiver function, a virtual reality (VR) terminal device, an augmented reality (AR) terminal device, a wireless terminal in industrial control, a wireless terminal in self-driving, a wireless terminal in remote medical surgery, a wireless terminal in smart grid, a wireless terminal in transportation safety, a wireless terminal in smart city, a wireless terminal in smart home, a terminal device supporting enhanced machine-type communication (eMTC) and/or a terminal device supporting long term evolution (LTE) of universal mobile communication technology, etc. The specific technologies adopted by the terminal device and the specific form of the terminal device are not limited in implementations of the disclosure.

The network device 202 is an entity at a network side that is used to transmit or receive a signal. The network device 202 may be an access network device. As an example, the network device is an evolved NodeB (eNB), a transmission reception point (TRP), or a next generation NodeB (gNB) in an NR system, a base station in other future mobile communication systems, etc. The network device may include an indoor network device, such as a customer premises network (CPN) device. The CPN device may include a premises radio access station (PRAS) and an evolved residential gateway (eRG). The specific technologies adopted by the network device and the specific form of the network device are not limited in implementations of the disclosure.

It is to be noted that, technical solutions of implementations of the disclosure can be applied to various communication systems, such as an LTE system, a fifth generation (5G) mobile communication system, a 5G new radio (NR) system. Optionally, the method of implementations of the disclosure is also applicable to various future communication systems, such as a sixth generation (6G) system, other communication networks, etc.

Figure 3:
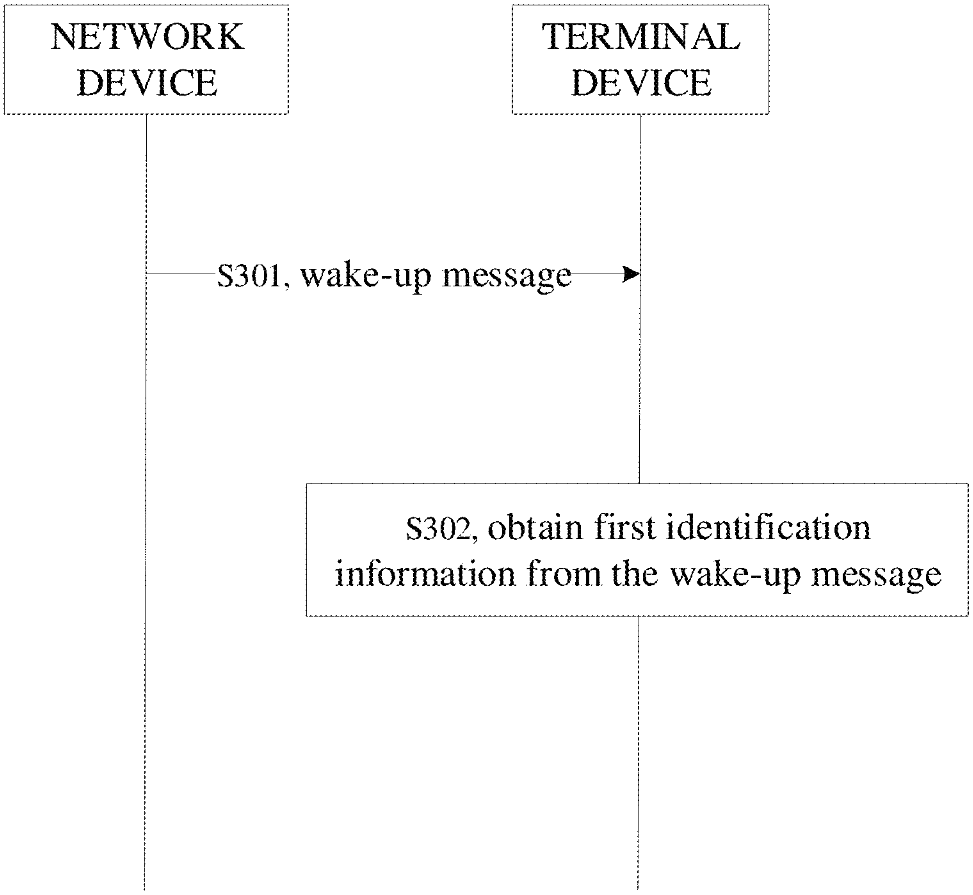
FIG. 3 is a flowchart illustrating a method for information transmission provided in implementations of the disclosure.

Referring to FIG. 3, FIG. 3 is a flowchart illustrating a method for information transmission provided in implementations of the disclosure. The method for information transmission can be implemented by the above terminal device and the above network device, or can be implemented by a chip in the above terminal device and a chip in the above network device. As illustrated in FIG. 3, the method for information transmission includes, but is not limited to, the following operations from S301 to S302.

S301, a network device sends a wake-up message, where the wake-up message carries first identification information, and the first identification information is all or part of terminal identification information. Accordingly, a terminal device receives the wake-up message from the network device.

After determining the terminal identification information, the network device sends the wake-up message to a serving cell where a terminal device identified by the terminal identification information is located, to wake up a terminal device(s) that matches the first identification information in the wake-up message. Accordingly, the terminal device in the serving cell receives the wake-up message from the network device, and determines whether to wake up its own primary circuit according to the first identification information carried in the wake-up message.

The wake-up message can be used to wake up a terminal device in a sleeping state, so that the awakened terminal device can turn on a primary circuit to further monitor a paging message through the primary circuit. The terminal device may be any terminal device in the serving cell, and the terminal device can receive the wake-up message to determine whether to wake up the primary circuit.

The first identification information may be all or part of the terminal identification information. If the first identification information is part of the terminal identification information, the terminal device that has received the wake-up message can determine whether to wake up its own primary circuit according to the first identification information carried in the wake-up message; after waking up the primary circuit, the terminal device can further monitor a paging message through the primary circuit, and determine whether to be paged according to the paging message. If the first identification information is all the terminal identification information, the terminal device that has received the wake-up message can determine whether to be paged according to the first identification information.

It is to be noted that, the entire process will be described in detail below with reference to an exemplary situation where the first identification information is part of the terminal identification information, which should not constitute any limitation to the disclosure.

In an implementation, the terminal identification information occupies N bits, and the first identification information contains values of N1 bits among the N bits, where N1 is a non-negative integer.

It is to be noted that, the N1 bits may have continuous or discontinuous serial numbers. As an example, the terminal identification information occupies 8 bits, and the first identification information contains values of 3 bits among the 8 bits. The serial numbers of the 3 bits may be 1 to 3, that is, the 3 bits have continuous serial numbers. Optionally, the serial numbers of the 3 bits are 1, 3, and 7 respectively, that is, the 3 bits have discontinuous serial numbers.

In an implementation, the N1 bits are the first N1 high bits among the N bits. Optionally, the N1 bits are the last N1 low bits among the N bits.

The high bits herein can be multiple bits from left to right, and said multiple bits are continuous in the serial number. As an example, the first N1 high bits are N1 continuous bits from left to right among the N bits. The low bits herein can be multiple bits from right to left, and said multiple bits are continuous in the serial number. As an example, the last N1 low bits are N1 continuous bits from right to left among the N bits.

It is to be noted that, the high bit can also be called left bit or front bit; similarly, the low bit can also be called right bit or back bit, which should not constitute any limitation to the disclosure.

In an implementation, the terminal identification information occupies N bits; the network device sends configuration information to the terminal device, where the configuration information indicates that the first identification information is used for determining values of high bits or low bits among the N bits. Accordingly, the terminal device receives the configuration information from the network device. That is, according to the configuration information, the terminal device can determine whether the wake-up message carries values of high bits among the N bits or values of low bits among the N bits. For example, the terminal identification information occupies 8 bits, the network device can configure the first identification information to be values of the first 4 high bits among the 8 bits. Accordingly, by receiving the configuration information, the terminal device can determine that the first identification information carried in the wake-up message is values of the first 4 high bits among the 8 bits. Optionally, the network device can also configure the first identification information to be values of the last 5 low bits among the 8 bits, which is not limited in the disclosure.

By sending the configuration information to the terminal device, the network device can pre-configure the number of specific bits occupied by the first identification information, and pre-configure whether said bits are high bits or low bits of the terminal identification information. Accordingly, the terminal device can determine, according to the configuration information, which bits of the terminal identification information belong to the first identification information, so as to determine values of the first identification information.

S302, the terminal device obtains the first identification information from the wake-up message.

After receiving the wake-up message, a terminal device(s) in the serving cell can obtain the first identification information from the wake-up message, to determine whether to wake up the primary circuit according to the first identification information.

In an implementation, the wake-up message explicitly carries the first identification information. The explicitly carrying herein means that the wake-up message contains the first identification information. As an example, the terminal identification information occupies 8 bits and the first identification information is values of 4 high bits of the terminal identification information, in this situation, the wake-up message can directly carry the values of the 4 high bits of the terminal identification information. By directly carrying the first identification information in the wake-up message, the first identification information can be sent to the terminal device synchronously when the network device sends the wake-up message, so that the terminal device can obtain the first identification information directly when receiving the wake-up message.

In another implementation, the wake-up message implicitly carries the first identification information. The implicitly carrying herein means that the wake-up message carries indication information, and the terminal device determines the first identification information according to the indication information, where there is a correspondence relationship between the indication information and the first identification information. The terminal device can determine the first identification information according to the correspondence relationship and the indication information carried in the wake-up message.

In an implementation, the correspondence relationship between the indication information and the first identification information may be set in advance, for instance, specified in the protocol. As an example, if the first identification information is values of the first 4 bits of the terminal identification information, a correspondence relationship between the indication information and the values of the first 4 bits may be set in advance. It can be understood that, the values of the first 4 bits have a total of 16 combinations. Therefore, 16 pieces of indication information can be set in advance to correspond to the 16 combinations respectively. For instance, indication information 1 is preset to correspond to a situation where the values of the 4 bits are 0000, indication information 2 is preset to correspond to a situation where the values of the 4 bits are 0001, and so forth, indication information 16 is preset to correspond to a situation where the values of the 4 bits are 1111. In this way, the first identification information and the indication information have a one-to-one correspondence. That is, after receiving the wake-up message, the terminal device can determine the first identification information according to the indication information carried in the wake-up message.

In another implementation, the correspondence relationship between the indication information and the first identification information is determined according to a message (e.g., a system message) sent by the network device. Specifically, the system message carries the correspondence relationship between the indication information and the first identification information. In this situation, the terminal device can obtain the correspondence relationship between the indication information and the first identification information from the received system message, and further determine the first identification information according to the correspondence relationship. As an example, if the system message indicates that indication information 1 corresponds to values of the first 5 bits of the terminal identification information and the values of the first 5 bits are 00000, after receiving the system message, the terminal device can determine that the first identification information is the values of the first 5 bits of the terminal identification information, and values of the first identification information are 00000.

Optionally, the indication information may be a sequence. That is, the wake-up message carries a sequence (e.g., a first sequence). It can be understood that, the above correspondence relationship may be a correspondence relationship between the sequence and the first identification information. The terminal device can determine the first identification information corresponding to the first sequence according to the first sequence and the correspondence relationship between the sequence and the first identification information. The first identification information corresponding to the first sequence is the first identification information. Optionally, the indication information may also be other forms of information, which is not limited in the disclosure.

The terminal device can receive the wake-up message from the network device and obtain the first identification information carried in the wake-up message, to determine whether its own identification information matches the first identification information, thereby determining whether to wake up its primary circuit.

As an example, if the first identification information is values of 4 high bits of the terminal identification information and the values of the 4 high bits are 0001, that is, a terminal device(s) in the serving cell can determine, according to the values of the 4 high bits, whether values of 4 high bits of its own identification information are 0001. If the values of the 4 high bits of its own identification information are 0001, it is necessary to wake up the primary circuit of the terminal device. If the values of the 4 high bits of its own identification information are not 0001, it is not necessary to wake up the primary circuit of the terminal device.

As an example, there are 10 terminal devices in the serving cell in all. The network device can send the wake-up message to the 10 terminal devices, and accordingly, the 10 terminal devices can receive the wake-up message. If among the 10 terminal devices, there are 5 terminal devices whose identification information matches the first identification information, the 5 terminal devices need to wake up their own primary circuit.

In implementations of the disclosure, the network device can send the wake-up message, and accordingly, the terminal device can receive the wake-up message and obtain the first identification information from the wake-up message, so as to determine whether to wake up the primary circuit according to the first identification information.

Figure 4:
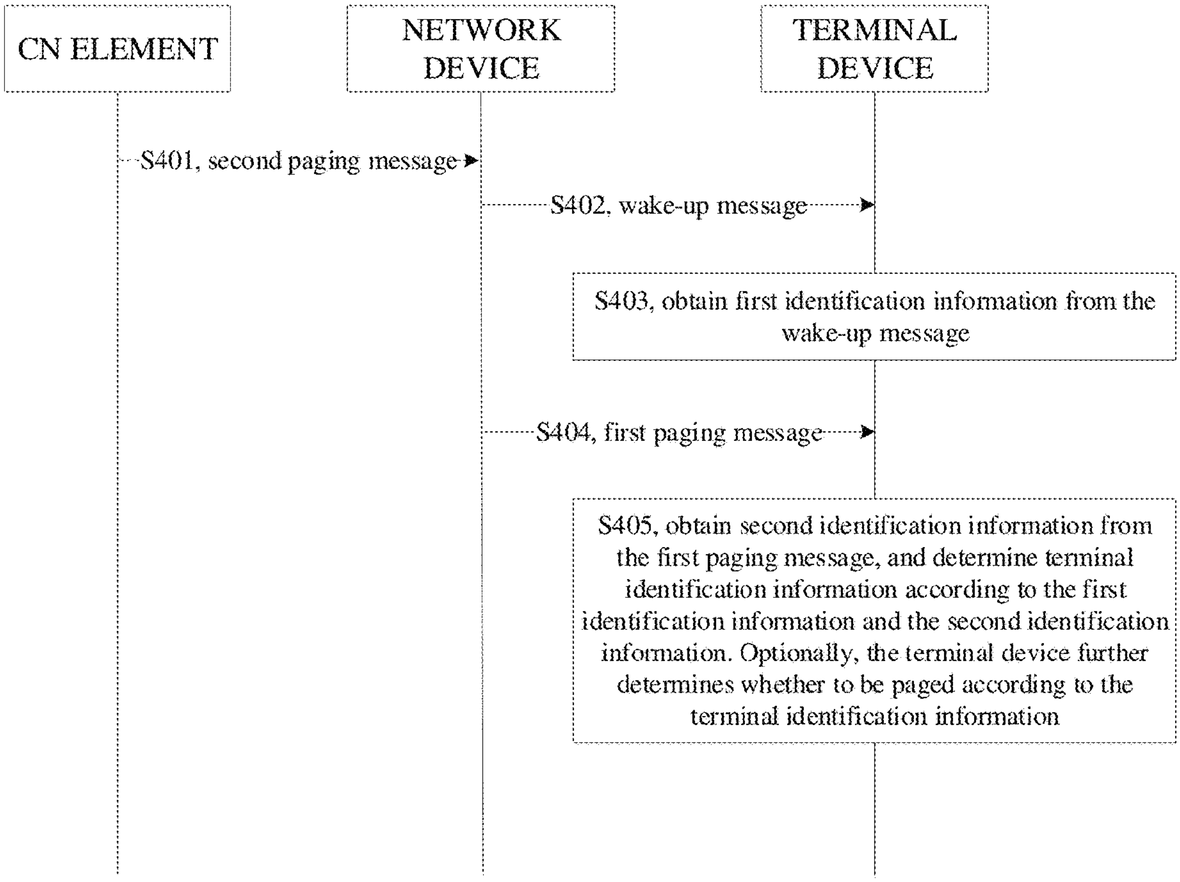
FIG. 4 is a flowchart illustrating a method for information transmission provided in other implementations of the disclosure.

Referring to FIG. 4, FIG. 4 is a flowchart illustrating a method for information transmission provided in other implementations of the disclosure. The method for information transmission can be implemented by the above terminal device and the above network device, or can be implemented by a chip in the above terminal device and a chip in the above network device. As illustrated in FIG. 4, the method for information transmission includes, but is not limited to, the following operations from S401 to S405.

Optionally, S401, a core network (CN) element sends a second paging message to a network device, where the second paging message indicates the terminal identification information. Accordingly, the network device receives the second paging message from the CN element.

Specifically, after determining the terminal identification information, the CN element sends the second paging message to a network device corresponding to a serving cell of a terminal device identified by the terminal identification information, to inform the network device that there is a terminal device, among terminal devices served by the network device, whose identification information matches the terminal identification information, that is, to inform the network device of the terminal device to be paged.

The CN element may be an access and mobility management function (AMF) or a mobility management entity (MME), etc., which is not limited in the disclosure.

S402, the network device sends a wake-up message, where the wake-up message carries first identification information, and the first identification information is all or part of terminal identification information. Accordingly, a terminal device receives the wake-up message from the network device.

Optionally, after receiving the second paging message from the CN element, the network device can determine the terminal identification information. Further, the network device can send the wake-up message in a serving cell of terminal devices, so that the terminal devices in the serving cell can determine whether to wake up their own primary circuit. Further, the terminal device whose primary circuit is awakened can receive the first paging message through the primary circuit to determine whether to be paged. The network device sending the wake-up message in the serving cell refers to broadcasting the wake-up message in the serving cell.

The network device can initiate paging in the serving cell through two methods, that is, radio access network (RAN) paging and CN paging. The primary difference between the RAN paging and the CN paging lies in: the terminal identification information corresponding to the RAN paging may be different from the terminal identification information corresponding to the CN paging. For example, the terminal identification information corresponding to the CN paging has 48 bits, while the terminal identification information corresponding to the RAN paging has 20 bits.

It is to be noted that, if a current paging is the CN paging, implementations of the disclosure may start from the operation at S401. It can be understood that, for the CN paging, the network device sends the wake-up message to the terminal device in the serving cell after receiving the second paging message from the CN element. Optionally, if the current paging is the RAN paging, implementations of the disclosure may start from the operations at S402.

In an implementation, the first paging message is an RAN paging message or a CN paging message. The RAN paging message is a paging message corresponding to the RAN paging, and the CN paging message is a paging message corresponding to the CN paging.

In an implementation, contents carried in the first paging message may be different from contents carried in the second paging message. Optionally, the format of the first paging message may also be different from that of the second paging message.

It can be understood that, when the network device initiates the CN paging, the corresponding paging message is the CN paging message; when the network device initiates the RAN paging, the corresponding paging message is the RAN paging message. Since the terminal identification information corresponding to the CN paging is different from the terminal identification information corresponding to the RAN paging, the first identification information and the second identification information corresponding to the CN paging as well as the first identification information and the second identification information corresponding to the RAN paging can be configured through the following two methods.

Method 1: the first identification information of the CN paging and the first identification information of the RAN paging are configured with the same number of bits. For example, both the first identification information corresponding to the CN paging and the first identification information corresponding to the RAN paging occupy M bits. It can be understood that, on condition that both the first identification information corresponding to the CN paging and the first identification information corresponding to the RAN paging occupy M bits, the number of bits of the second identification information corresponding to the CN paging may be the same as or different from the number of bits of the second identification information corresponding to the RAN paging. For example, if the terminal identification information corresponding to the CN paging occupies 48 bits, the terminal identification information corresponding to the RAN paging occupies 20 bits, and the first identification information corresponding to the above two paging is values of 10 bits, accordingly, the second identification information corresponding to the CN paging is values of the remaining 38 bits, and the second identification information corresponding to the RAN paging is values of the remaining 10 bits.

Method 2: the first identification information of the CN paging and the first identification information of the RAN paging are configured with different number of bits. For example, the first identification information of the CN paging occupies M1 bits, and the first identification information of the RAN paging occupies M2 bits. It can be understood that, on condition that the number of bits of the first identification information corresponding to the CN paging is different from the number of bits of the first identification information corresponding to the RAN paging, the number of bits of the second identification information corresponding to the CN paging may be the same as or different from the number of bits of the second identification information corresponding to the RAN paging, which is not limited in the disclosure. For example, if the terminal identification information corresponding to the CN paging occupies 48 bits, the terminal identification information corresponding to the RAN paging occupies 20 bits, the first identification information corresponding to the CN paging is values of 38 bits, and the first identification information corresponding to the RAN paging is values of 10 bits, accordingly, the second identification information corresponding to the CN paging is values of the remaining 10 bits, and the second identification information corresponding to the RAN paging is values of the remaining 10 bits. In this example, for the CN paging and the RAN paging, the number of bits of the second identification information corresponding to the CN paging is the same as the number of bits of the second identification information corresponding to the RAN paging. It should be understood that, this example is merely illustrative, which should not constitute any limitation to the disclosure.

S403, the terminal device obtains the first identification information from the wake-up message.

Specifically, for the details of the operations at S402 and S403, references can be made to the relevant description of the operations at S301 and S302 in the implementations illustrated in FIG. 3, which will not be repeated in the disclosure.

S404, the network device sends a first paging message, where the first paging message carries second identification information, and the second identification information is all or part of the terminal identification information. Accordingly, the terminal device receives the first paging message from the network device.

The network device sends the first paging message in the serving cell after sending the wake-up message. Accordingly, after waking up the primary circuit of the terminal device, the terminal device receives the first paging message from the network device, to determine whether to be paged according to the second identification information carried in the first paging message.

It is to be noted that, since there may be multiple terminal devices whose identification information matches the first identification information, that is, there may be multiple terminal devices whose primary circuit is awakened, the above terminal device may be any terminal device among the multiple terminal devices whose primary circuit is awakened. The terminal device can obtain the second identification information by receiving the first paging message, to determine whether its own identification information matches the second identification information, that is, to determine whether to be paged.

In an implementation, the terminal identification information occupies N bits, and the second identification information contains values of N2 bits among the N bits, where N2 is a non-negative integer. It can be understood that, the second identification information contains values of bits, other than N1 bits of the first identification information, among the N bits. For example, if the terminal identification information occupies 8 bits and the first identification information contains values of 3 bits among the 8 bits, the second identification information contains values of the remaining 5 bits among the 8 bits. If the serial numbers of the 3 bits of the first identification information are 1, 2, and 3 respectively, the serial numbers of the 5 bits of the second identification information are 4, 5, 6, 7, and 8 respectively. Optionally, if the serial numbers of the 3 bits of the first identification information are 1, 3, and 7 respectively, the serial numbers of the 5 bits of the second identification information are 2, 4, 5, 6, and 8 respectively.

In an implementation, the N2 bits are the last N2 low bits among the N bits. Optionally, the N2 bits are the first N2 high bits among the N bits. The last N2 low bits are N2 continuous bits from right to left among the N bits. Optionally, the first N2 high bits are N2 continuous bits from left to right among the N bits.

Optionally, the above configuration information may also indicate that the second identification information is used for determining values of high bits or low bits among the N bits. Optionally, the configuration information may explicitly or implicitly indicate that the second identification information is used for determining values of high bits or low bits among the N bits. For the relevant content of the configuration information, references can be made to the detailed description of the implementations illustrated in FIG. 3, which will not be repeated in the disclosure. It can be understood that, if the configuration information indicates that the first identification information is used for determining values of high bits among the N bits, it can be determined that the second identification information is used for determining values of low bits among the N bits. As another example, if the configuration information indicates that the first identification information is used for determining values of low bits among the N bits, it can be determined that the second identification information is used for determining values of high bits among the N bits.

S405, the terminal device obtains the second identification information from the first paging message, and determines the terminal identification information according to the first identification information and the second identification information. Optionally, the terminal device further determines whether the terminal device is paged according to the terminal identification information.

The terminal device can receive the first paging message from the network device and obtain the second identification information carried in the first paging message, to determine whether its own identification information matches the second identification information, so as to determine whether the terminal device is paged.

It is to be noted that, the first paging message can also carry the second identification information explicitly or implicitly. For the relevant content of the second identification information, references can be made to the detailed description of the implementations illustrated in FIG. 3, which will not be repeated in the disclosure.

In an implementation, the terminal identification information occupies N bits, and the terminal device determines the terminal identification information according to the first identification information and the second identification information as follows. The terminal device determines values of the N bits according to values of N/bits contained in the first identification information and values of N2 bits contained in the second identification information, where N1 and N2 each are a non-negative integer, and N1+N2=N. On condition that both N1 and N2 are a positive integer, in other words, the first identification information is part of the identification information, and the second identification information is another part of the identification information. It can be understood that, the first identification information and the second identification information constitute the complete identification information.

Optionally, the first identification information may also be the complete terminal identification information, that is, N=N1; optionally, the second identification information may also be the complete terminal identification information, that is, N=N2, which is not limited in the disclosure.

It is to be noted that, after determining the complete terminal identification information, the terminal device can compare its own identification information with the complete terminal identification information to determine whether to be paged. If its own identification information matches the complete (terminal) identification information (e.g., the same), it is determined that the terminal device is paged. Conversely, if its own identification information does not match the complete (terminal) identification information (e.g., different), it is determined that the terminal device is not paged.

According to the method of implementations of the disclosure, the network device sends the wake-up message, and accordingly, the terminal device wakes up the primary circuit of the terminal device after receiving the wake-up message. Then, the network device sends the first paging message, and accordingly, after receiving the first paging message, the terminal device obtains the second identification information to determine whether to be paged.

Figure 5:
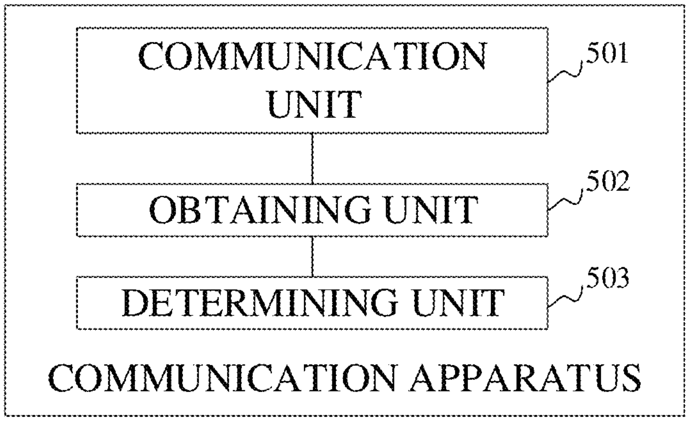
FIG. 5 is a schematic structural diagram illustrating a communication apparatus provided in implementations of the disclosure.

Referring to FIG. 5, FIG. 5 is a schematic structural diagram illustrating a communication apparatus provided in implementations of the disclosure. The communication apparatus may be the above terminal device, an apparatus in the above terminal device, or an apparatus used in conjunction with the above terminal device. The communication apparatus illustrated in FIG. 5 includes a communication unit 501, an obtaining unit 502, and a determining unit 503. The communication unit 501 integrates a receiving unit, a sending unit, etc. The communication unit 501 can also be called a transceiver unit. Alternatively, the communication unit 501 can also be divided into a receiving unit and a sending unit. The detailed description of each unit is as follows. The communication unit 501 is configured to receive a wake-up message, where the wake-up message carries first identification information, and the first identification information is all or part of terminal identification information. The obtaining unit 502 is configured to obtain the first identification information from the wake-up message.

In an implementation, the communication unit 501 is further configured to receive a first paging message, where the first paging message carries second identification information, and the second identification information is all or part of the terminal identification information. The obtaining unit 502 is further configured to obtain the second identification information from the first paging message. The determining unit 503 is configured to determine the terminal identification information according to the first identification information and the second identification information.

In an implementation, the terminal identification information occupies N bits, and the first identification information contains values of N1 bits among the N bits, where N1 is a non-negative integer.

In an implementation, the N/bits are the first N1 high bits among the N bits.

In an implementation, the terminal identification information occupies N bits, and the second identification information contains values of N2 bits among the N bits, where N2 is a non-negative integer.

In an implementation, the N2 bits are the last N2 low bits among the N bits.

In an implementation, the determining unit 503 is further configured to determine values of the N bits according to values of N1 bits contained in the first identification information and values of N2 bits contained in the second identification information, where N1 and N2 each are a non-negative integer, and N1+N2=N.

In an implementation, the terminal identification information occupies N bits, and the communication unit 501 is further configured to receive configuration information, where the configuration information indicates that the first identification information is used for determining values of high bits or low bits among the N bits.

In an implementation, the wake-up message carries indication information, and the determining unit 503 is further configured to determine the first identification information according to indication information.

In an implementation, the first paging message is an RAN paging message or a CN paging message.

In an implementation, the determining unit 503 is further configured to determine whether to be paged according to the terminal identification information.

According to implementations of the disclosure, the units of the communication apparatus illustrated in FIG. 5 may be separately or entirely combined into one or several additional units to form the communication apparatus, or one (or some) of these units may be further divided into multiple functionally smaller units, which can implement same operations without affecting realization of technical effects of implementations of the disclosure. The above units are divided based on logical functions. In practical applications, the function of one unit may also be realized through multiple units, or the functions of multiple units may be realized through one unit. In other implementations of the disclosure, the communication apparatus further includes other units. In practical applications, these functions may also be realized with the assistance of other units, and may be realized through cooperation of multiple units.

The communication apparatus may be, for example, a chip or a chip module. The module (or unit) in each apparatus or product described in the foregoing implementations may be a software module or a hardware module, or part of the module is a software module while part of the module is a hardware module. For example, various modules contained in each apparatus or product applied to or integrated into a chip can be implemented in the form of hardware such as circuits, or at least some of the modules can be implemented in the form of a software program that runs on a processor integrated in the chip, while the remaining modules (if any) can be implemented in the form of hardware such as circuits. Various modules contained in each apparatus or product applied to or integrated into a chip module can be implemented in the form of hardware such as circuits, and different modules may be provided in a same component (e.g., a chip, or a circuit module) or in different components of the chip module, or at least some of the modules can be implemented in the form of a software program that runs on a processor integrated in the chip module, while the remaining modules (if any) can be implemented in the form of hardware such as circuits. Various modules contained in each apparatus or product applied to or integrated into a terminal can be implemented in the form of hardware such as circuits, and different modules may be provided in a same component (e.g., a chip, or a circuit module) or in different components of the terminal, or at least some of the modules can be implemented in the form of a software program that runs on a processor integrated in the terminal, while the remaining modules (if any) can be implemented in the form of hardware such as circuits.

Since the above implementations of the disclosure are based on the same concept as the foregoing method implementations, the technical effects achieved through the above implementations of the disclosure are also the same as the technical effects achieved through the foregoing method implementations. For details of the specific principles, reference can made to the description of the foregoing implementations, which will not be repeated herein.

Figure 6:
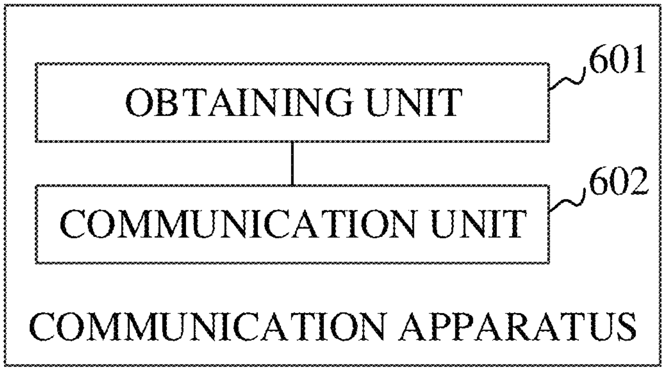
FIG. 6 is a schematic structural diagram illustrating a communication apparatus provided in other implementations of the disclosure.

Referring to FIG. 6, FIG. 6 is a schematic structural diagram illustrating a communication apparatus provided in implementations of the disclosure. The communication apparatus may be the above network device, an apparatus in the above network device, or an apparatus used in conjunction with the above network device. The communication apparatus includes an obtaining unit 601 and a communication unit 602. The communication unit 602 integrates a receiving unit, a sending unit, etc. The communication unit 602 can also be called a transceiver unit. Alternatively, the communication unit 602 can also be divided into a receiving unit and a sending unit. The obtaining unit 601 is configured to obtain first identification information, where the first identification information is all or part of terminal identification information. The communication unit 602 is configured to send a wake-up message, where the wake-up message carries the first identification information.

In an implementation, the communication unit 602 is further configured to send a first paging message, where the first paging message carries second identification information, and the second identification information is all or part of the terminal identification information.

In an implementation, the terminal identification information occupies N bits, and the first identification information contains values of N/bits among the N bits, where N1 is a non-negative integer.

In an implementation, the N/bits are the first N1 high bits among the N bits.

In an implementation, the terminal identification information occupies N bits, and the second identification information contains values of N2 bits among the N bits, where N2 is a non-negative integer.

In an implementation, the N2 bits are the last N2 low bits among the N bits.

In an implementation, the terminal identification information occupies N bits, and values of the N bits are determined according to values of N1 bits contained in the first identification information and values of N2 bits contained in the second identification information.

In an implementation, the terminal identification information occupies N bits, and the communication unit 602 is further configured to send configuration information, where the configuration information indicates that the first identification information is used for determining values of high bits or low bits among the N bits.

In an implementation, the wake-up message carries indication information, and the indication information is used for determining the first identification information.

In an implementation, the first paging message is an RAN paging message or a CN paging message.

In an implementation, the first paging message is a CN paging message, and before sending the wake-up message, the communication unit 602 is further configured to receive a second paging message from a CN element, where the second paging message indicates the terminal identification information.

According to implementations of the disclosure, the units of the communication apparatus illustrated in FIG. 6 may be separately or entirely combined into one or several additional units to form the communication apparatus, or one (or some) of these units may be further divided into multiple functionally smaller units, which can implement same operations without affecting realization of technical effects of implementations of the disclosure. The above units are divided based on logical functions. In practical applications, the function of one unit may also be realized through multiple units, or the functions of multiple units may be realized through one unit. In other implementations of the disclosure, the communication apparatus further includes other units. In practical applications, these functions may also be realized with the assistance of other units, and may be realized through cooperation of multiple units.

The communication apparatus may be, for example, a chip or a chip module. The module (or unit) in each apparatus or product described in the foregoing implementations may be a software module or a hardware module, or part of the module is a software module while part of the module is a hardware module. For example, various modules contained in each apparatus or product applied to or integrated into a chip can be implemented in the form of hardware such as circuits, or at least some of the modules can be implemented in the form of a software program that runs on a processor integrated in the chip, while the remaining modules (if any) can be implemented in the form of hardware such as circuits. Various modules contained in each apparatus or product applied to or integrated into a chip module can be implemented in the form of hardware such as circuits, and different modules may be provided in a same component (e.g., a chip, or a circuit module) or in different components of the chip module, or at least some of the modules can be implemented in the form of a software program that runs on a processor integrated in the chip module, while the remaining modules (if any) can be implemented in the form of hardware such as circuits. Various modules contained in each apparatus or product applied to or integrated into a terminal can be implemented in the form of hardware such as circuits, and different modules may be provided in a same component (e.g., a chip, or a circuit module) or in different components of the terminal, or at least some of the modules can be implemented in the form of a software program that runs on a processor integrated in the terminal, while the remaining modules (if any) can be implemented in the form of hardware such as circuits.

Since the above implementations of the disclosure are based on the same concept as the foregoing method implementations, the technical effects achieved through the above implementations of the disclosure are also the same as the technical effects achieved through the foregoing method implementations. For details of the specific principles, reference can made to the description of the foregoing implementations, which will not be repeated herein.

Figure 7:
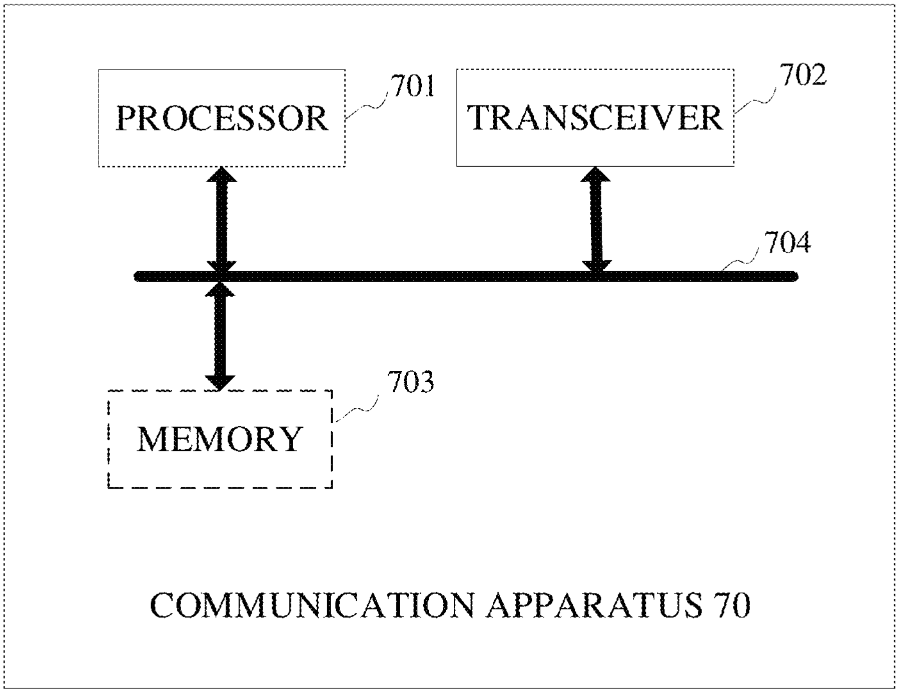
FIG. 7 is a schematic structural diagram illustrating a communication apparatus provided in other implementations of the disclosure.

Referring to FIG. 7, FIG. 7 illustrates a communication apparatus 70 provided in implementations of the disclosure. As illustrated in FIG. 7, the communication apparatus 70 includes a processor 701 and a transceiver 702. Optionally, the communication apparatus further includes a memory 703. The processor 701, the transceiver 702, and the memory 703 are coupled via a bus 704 or other apparatuses. The bus is represented by a thick line in FIG. 7, and the connections between other components are merely schematically illustrated, which is not limited herein. The bus may be an address bus, a data bus, a control bus, etc. For case of presentation, only one thick line is used to represent the bus in FIG. 7, but it does not mean that there is only one bus or one type of bus.

The coupling in implementations of the disclosure may be an indirect coupling or an indirect communication connection between apparatuses, units, or modules, and may be electrical coupling, mechanical coupling, or other forms of coupling. The coupling is used for information interaction between apparatuses, units, or modules. The specific connection medium between the processor 701 and the memory 703 is not limited in implementations of the disclosure.

The memory 703 may include a read-only memory (ROM) and a random access memory (RAM), and provides instructions and data for the processor 701. Part of the memory 703 may also include a non-transitory RAM.

The processor 701 may be a central processing unit (CPU). The processor 701 may also be other general-purpose processors, digital signal processors (DSP), application specific integrated circuits (ASIC), field-programmable gate array (FPGA) or other programmable logic devices, discrete gate or transistor logic devices, discrete hardware components, etc. The general-purpose processor may be a microprocessor. Optionally, the processor 701 may also be any conventional processor. The memory 703 is configured to store program instructions. The processor 701 is configured to call the program instructions stored in the memory 703 to call the transceiver 702 to receive a wake-up message, the wake-up message carrying first identification information, and the first identification information being all or part of terminal identification information. The processor 701 is further configured to obtain the first identification information from the wake-up message.

In an implementation, the transceiver 702 is further configured to receive a first paging message, where the first paging message carries second identification information, and the second identification information is all or part of the terminal identification information. The processor 701 is further configured to obtain the second identification information from the first paging message. The processor 701 is further configured to determine the terminal identification information according to the first identification information and the second identification information.

In an implementation, the terminal identification information occupies N bits, and the first identification information contains values of N1 bits among the N bits, where N1 is a non-negative integer.

In an implementation, the N1 bits are the first N1 high bits among the N bits.

In an implementation, the terminal identification information occupies N bits, and the second identification information contains values of N2 bits among the N bits, where N2 is a non-negative integer.

In an implementation, the N2 bits are the last N2 low bits among the N bits.

In an implementation, the terminal identification information occupies N bits, and the processor 701 is further configured to determine values of the N bits according to values of N1 bits contained in the first identification information and values of N2 bits contained in the second identification information, where N1 and N2 each are a non-negative integer, and N1+N2=N.

In an implementation, the terminal identification information occupies N bits, and the transceiver 702 is further configured to receive configuration information, where the configuration information indicates that the first identification information is used for determining values of high bits or low bits among the N bits.

In an implementation, the wake-up message carries indication information, and the processor 701 is further configured to determine the first identification information according to the indication information.

In an implementation, the first paging message is an RAN paging message or a CN paging message.

In an implementation, the processor 701 is further configured to determine whether to be paged according to the terminal identification information.

The above communication apparatus can also be configured to implement the functions of the network device of the foregoing method implementations. The communication apparatus may be a network device or an apparatus in a network device. The apparatus in the network device may be a chip system or a chip of the network device. The chip system may be composed of chips, or include chips and other discrete devices. The communication apparatus 70 includes a processor 701 and a transceiver 702. Optionally, the communication apparatus further includes a memory 703. The memory 703 is configured to store program instructions. The processor 701 is configured to call the program instructions stored in the memory 703 to obtain first identification information, where the first identification information is all or part of terminal identification information. The transceiver 702 is configured to send a wake-up message, where the wake-up message carries the first identification information.

In an implementation, the transceiver 702 is further configured to send a first paging message, where the first paging message carries second identification information, and the second identification information is all or part of the terminal identification information.

In an implementation, the terminal identification information occupies N bits, and the first identification information contains values of N1 bits among the N bits, where N1 is a non-negative integer.

In an implementation, the N1 bits are the first N1 high bits among the N bits.

In an implementation, the terminal identification information occupies N bits, and the second identification information contains values of N2 bits among the N bits, where N2 is a non-negative integer.

In an implementation, the N2 bits are the last N2 low bits among the N bits.

In an implementation, the terminal identification information occupies N bits, and values of the N bits are determined according to values of N1 bits contained in the first identification information and values of N2 bits contained in the second identification information.

In an implementation, the terminal identification information occupies N bits, and the transceiver 702 is further configured to send configuration information, where the configuration information indicates that the first identification information is used for determining values of high bits or low bits among the N bits.

In an implementation, the wake-up message carries indication information, and the indication information is used for determining the first identification information.

In an implementation, the first paging message is an RAN paging message or a CN paging message.

In an implementation, the first paging message is a CN paging message, and the transceiver 702 is further configured to receive a second paging message from a CN element before sending the wake-up message, where the second paging message indicates the terminal identification information.

In implementations of the disclosure, the method of implementations of the disclosure can be implemented by running computer programs (including program codes) on a general-purpose computing apparatus, the computer programs are operable to execute the operations of the method illustrated in FIG. 2, for example, the general-purpose computing apparatus is a computer including a storage unit and a processing unit such as a CPU, a RAM, a ROM, etc. The computer programs may be recorded on, for example, a computer-readable recording medium, and are loaded on the above computing apparatus through the computer-readable recording medium and run on the above computing apparatus.

Based on the same inventive concept, the problem-solving principles and the achieved technical effects of the communication apparatus of implementations of the disclosure are similar to the problem-solving principles and the achieved technical effects of the communication apparatus involved in the foregoing method implementations of the disclosure, and thus, reference can be made to the principles and the technical effects of the method implementations, which will not be repeated herein, for the sake of concise description.

Implementations of the disclosure further provide a chip. The chip can perform the operations related to the terminal device in the foregoing method implementations. The chip is configured to: receive a wake-up message, where the wake-up message carries first identification information, and the first identification information is all or part of terminal identification information; and obtain the first identification information from the wake-up message.

In an implementation, the chip is further configured to receive a first paging message, where the first paging message carries second identification information, and the second identification information is all or part of the terminal identification information. The chip is further configured to obtain the second identification information from the first paging message. The chip is further configured to determine the terminal identification information according to the first identification information and the second identification information.

In an implementation, the terminal identification information occupies N bits, and the first identification information contains values of N/bits among the N bits, where N1 is a non-negative integer.

In an implementation, the N/bits are the first N1 high bits among the N bits.

In an implementation, the terminal identification information occupies N bits, and the second identification information contains values of N2 bits among the N bits, where N2 is a non-negative integer.

In an implementation, the N2 bits are the last N2 low bits among the N bits.

In an implementation, the terminal identification information occupies N bits, and the chip is further configured to determine values of the N bits according to values of N/bits contained in the first identification information and values of N2 bits contained in the second identification information, where N/and N2 each are a non-negative integer, and N1+N2=N.

In an implementation, the terminal identification information occupies N bits, and the chip is further configured to receive configuration information, where the configuration information indicates that the first identification information is used for determining values of high bits or low bits among the N bits.

In an implementation, the wake-up message carries indication information, and the chip is further configured to determine the first identification information according to the indication information.

In an implementation, the first paging message is an RAN paging message or a CN paging message.

In an implementation, the chip is further configured to determine whether to be paged according to the terminal identification information.

In an implementation, the chip includes at least one processor, at least one first memory, and at least one second memory. The at least one first memory and the at least one processor are interconnected through lines, and the first memory stores instructions. The at least one second memory and the at least one processor are interconnected through lines, and the second memory stores data required for implementing the foregoing method implementations.

Implementations of the disclosure further provide another chip. The chip can perform the operations related to the network device in the foregoing method implementations. The chip is configured to: obtain first identification information, where the first identification information is all or part of terminal identification information; and send a wake-up message, where the wake-up message carries the first identification information.

In an implementation, the chip is further configured to send a first paging message, where the first paging message carries second identification information, and the second identification information is all or part of the terminal identification information.

In an implementation, the terminal identification information occupies N bits, and the first identification information contains values of N1 bits among the N bits, where N1 is a non-negative integer.

In an implementation, the N1 bits are the first N1 high bits among the N bits.

In an implementation, the terminal identification information occupies N bits, and the second identification information contains values of N2 bits among the N bits, where N2 is a non-negative integer.

In an implementation, the N2 bits are the last N2 low bits among the N bits.

In an implementation, the terminal identification information occupies N bits, and values of the N bits are determined according to values of N1 bits contained in the first identification information and values of N2 bits contained in the second identification information.

In an implementation, the terminal identification information occupies N bits, and the chip is further configured to send configuration information, where the configuration information indicates that the first identification information is used for determining values of high bits or low bits among the N bits.

In an implementation, the wake-up message carries indication information, and the indication information is used for determining the first identification information.

In an implementation, the first paging message is an RAN paging message or a CN paging message.

In an implementation, the first paging message is a CN paging message, and the chip is further configured to receive a second paging message from a CN element before sending the wake-up message, where the second paging message indicates the terminal identification information.

In an implementation, the chip includes at least one processor, at least one first memory, and at least one second memory. The at least one first memory and the at least one processor are interconnected through lines, and the first memory stores instructions. The at least one second memory and the at least one processor are interconnected through lines, and the second memory stores data required for implementing the foregoing method implementations.

Various modules contained in each apparatus or product applied to or integrated into a chip can be implemented in the form of hardware such as circuits, or at least some of the modules can be implemented in the form of a software program that runs on a processor integrated in the chip, while the remaining modules (if any) can be implemented in the form of hardware such as circuits.

Figure 8:
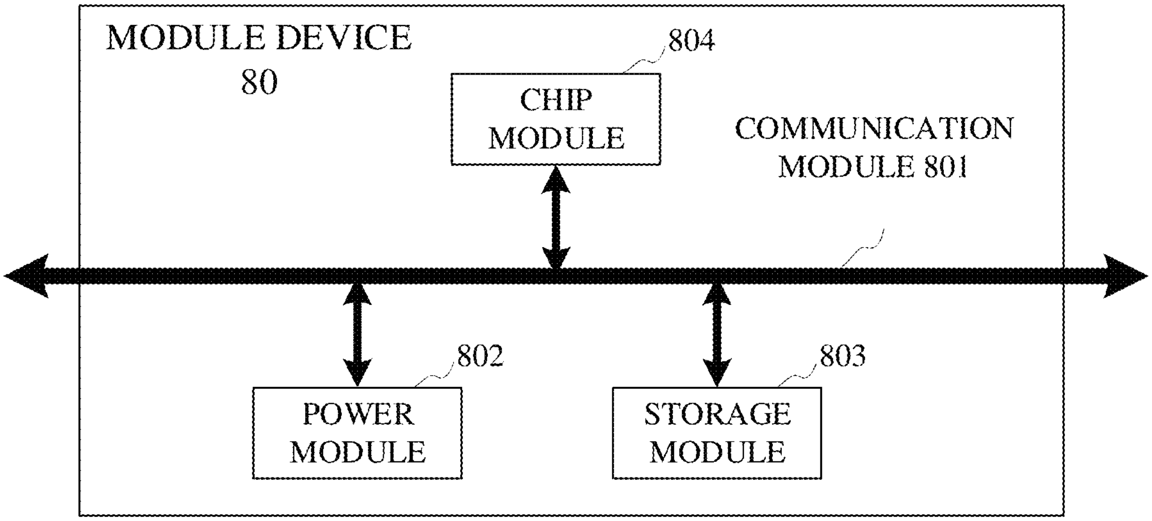
FIG. 8 is a schematic structural diagram illustrating a module device provided in implementations of the disclosure.

Referring to FIG. 8, FIG. 8 is a schematic structural diagram illustrating a module device provided in implementations of the disclosure. A module device 80 can perform the operations related to the terminal device in the foregoing method implementations. The module device 80 includes a communication module 801, a power module 802, a storage module 803, and a chip module 804. The power module 802 is configured to provide electrical energy for the module device. The storage module 803 is configured to store data and instructions. The communication module 801 is configured for internal communication of the module device, or for communication between the module device and an external apparatus. The chip module 804 is configured to: receive a wake-up message, the wake-up message carrying first identification information, and the first identification information being all or part of terminal identification information; and obtain the first identification information from the wake-up message.

In an implementation, the chip module 804 is further configured to receive a first paging message, where the first paging message carries second identification information, and the second identification information is all or part of the terminal identification information. The chip module 804 is further configured to obtain the second identification information from the first paging message. The chip module 804 is further configured to determine the terminal identification information according to the first identification information and the second identification information.

In an implementation, the terminal identification information occupies N bits, and the first identification information contains values of N1 bits among the N bits, where N1 is a non-negative integer.

In an implementation, the N/bits are the first N1 high bits among the N bits.

In an implementation, the terminal identification information occupies N bits, and the second identification information contains values of N2 bits among the N bits, where N2 is a non-negative integer.

In an implementation, the N2 bits are the last N2 low bits among the N bits.

In an implementation, the terminal identification information occupies N bits, and the chip module 804 is further configured to determine values of the N bits according to values of N1 bits contained in the first identification information and values of N2 bits contained in the second identification information, where N1 and N2 each are a non-negative integer, and N1+N2=N.

In an implementation, the terminal identification information occupies N bits, and the chip module 804 is further configured to receive configuration information, where the configuration information indicates that the first identification information is used for determining values of high bits or low bits among the N bits.

In an implementation, the wake-up message carries indication information, and the chip module 804 is further configured to determine the first identification information according to the indication information.

In an implementation, the first paging message is an RAN paging message or a CN paging message.

In an implementation, the chip module 804 is further configured to determine whether to be paged according to the terminal identification information.

Referring to FIG. 8, FIG. 8 is a schematic structural diagram illustrating a module device provided in implementations of the disclosure. A module device 80 can perform the operations related to the network device in the foregoing method implementations. The module device 80 includes a communication module 801, a power module 802, a storage module 803, and a chip module 804. The power module 802 is configured to provide electrical energy for the module device. The storage module 803 is configured to store data and instructions. The communication module 801 is configured for internal communication of the module device, or for communication between the module device and an external apparatus. The chip module 804 is configured to: obtain first identification information, the first identification information being all or part of terminal identification information; and send a wake-up message, the wake-up message carrying the first identification information.

In an implementation, the chip module 804 is further configured to send a first paging message, where the first paging message carries second identification information, and the second identification information is all or part of the terminal identification information.

In an implementation, the terminal identification information occupies N bits, and the first identification information contains values of N1 bits among the N bits, where N1 is a non-negative integer.

In an implementation, the N1 bits are the first N1 high bits among the N bits.

In an implementation, the terminal identification information occupies N bits, and the second identification information contains values of N2 bits among the N bits, where N2 is a non-negative integer.

In an implementation, the N2 bits are the last N2 low bits among the N bits.

In an implementation, the terminal identification information occupies N bits, and values of the N bits are determined according to values of N1 bits contained in the first identification information and values of N2 bits contained in the second identification information.

In an implementation, the terminal identification information occupies N bits, and the chip module 804 is further configured to send configuration information, where the configuration information indicates that the first identification information is used for determining values of high bits or low bits among the N bits.

In an implementation, the wake-up message carries indication information, and the indication information is used for determining the first identification information.

In an implementation, the first paging message is an RAN paging message or a CN paging message.

In an implementation, the first paging message is a CN paging message, and the chip module 804 is further configured to receive a second paging message from a CN element before sending the wake-up message, where the second paging message indicates the terminal identification information.

Various modules contained in each apparatus or product applied to or integrated into a chip module can be implemented in the form of hardware such as circuits, and different modules may be provided in a same component of the chip module (e.g., a chip, or a circuit module) or in different components of the chip module, or at least some of the modules can be implemented in the form of a software program that runs on a processor integrated in the chip module, while the remaining modules (if any) can be implemented in the form of hardware such as circuits.

Implementations of the disclosure further provide a non-transitory computer-readable storage medium. The non-transitory computer-readable storage medium stores one or more instructions which are operable with a processor to load and execute the method of the foregoing method implementations.

Implementations of the disclosure further provide a computer program product. The computer program product contains instructions which, when run on a computer, cause the computer to execute the method of the foregoing method implementations.

It is to be noted that, for the sake of simplicity, the foregoing method implementations are described as a series of action combinations, however, it will be appreciated by those skilled in the art that the disclosure is not limited by the sequence of actions described. That is because that, according to the disclosure, certain steps or operations may be performed in other order or simultaneously. Besides, it will be appreciated by those skilled in the art that the implementations described in the specification are exemplary implementations, and the actions and modules involved are not necessarily essential to the disclosure.

According to actual needs, the operations in the method of implementations of the disclosure may be adjusted in terms of execution order, combined, or deleted.

According to actual needs, the modules in the apparatus of implementations of the disclosure may be combined, further divided, or deleted.

Those of ordinary skill in the art can understand that all or part of the operations in the various methods of the foregoing implementations may be completed by instructing relevant hardware through a program. The program is stored in a computer-readable storage medium. The readable storage medium may include a flash disk, a ROM, a RAM, and a magnetic disk or optical disk, etc.

The disclosure provides methods for information transmission, communication apparatuses, chips, and module devices, which can realize more efficient use of a wake-up message by carrying all or part of terminal identification information in the wake-up message.

In a first aspect, the disclosure provides a method for information transmission. The method includes: receiving a wake-up message, the wake-up message carrying first identification information, and the first identification information being all or part of terminal identification information; and obtaining the first identification information from the wake-up message.

In an implementation, the method further includes: receiving a first paging message, the first paging message carrying second identification information, and the second identification information being all or part of the terminal identification information; obtaining the second identification information from the first paging message; and determining the terminal identification information according to the first identification information and the second identification information.

In an implementation, the terminal identification information occupies N bits, and the first identification information contains values of N1 bits among the N bits, where N1 is a non-negative integer.

In an implementation, the N1 bits are the first N1 high bits among the N bits.

In an implementation, the terminal identification information occupies N bits, and the second identification information contains values of N2 bits among the N bits, where N2 is a non-negative integer.

In an implementation, the N2 bits are the last N2 low bits among the N bits.

In an implementation, the terminal identification information occupies N bits, and determining the terminal identification information according to the first identification information and the second identification information includes: determining values of the N bits according to values of N1 bits contained in the first identification information and values of N2 bits contained in the second identification information, where N1 and N2 each are a non-negative integer, and N1+N2=N.

In an implementation, the terminal identification information occupies N bits, and the method further includes: receiving configuration information, the configuration information indicating that the first identification information is used for determining values of high bits or low bits among the N bits.

In an implementation, the wake-up message carries indication information, and the method further includes: determining the first identification information according to the indication information.

In an implementation, the first paging message is an RAN paging message or a CN paging message.

In an implementation, the method further includes: determining whether to be paged according to the terminal identification information.

In a second aspect, the disclosure provides a method for information transmission. The method includes: obtaining first identification information, the first identification information being all or part of terminal identification information; and sending a wake-up message, the wake-up message carrying the first identification information.

In an implementation, the method further includes: sending a first paging message, the first paging message carrying second identification information, and the second identification information being all or part of the terminal identification information.

In an implementation, the terminal identification information occupies N bits, and the first identification information contains values of N1 bits among the N bits, where N1 is a non-negative integer.

In an implementation, the N/bits are the first N1 high bits among the N bits.

In an implementation, the terminal identification information occupies N bits, and the second identification information contains values of N2 bits among the N bits, where N2 is a non-negative integer.

In an implementation, the N2 bits are the last N2 low bits among the N bits.

In an implementation, the terminal identification information occupies N bits, and values of the N bits are determined according to values of N1 bits contained in the first identification information and values of N2 bits contained in the second identification information.

In an implementation, the terminal identification information occupies N bits, and the method further includes: sending configuration information, the configuration information indicating that the first identification information is used for determining values of high bits or low bits among the N bits.

In an implementation, the wake-up message carries indication information, and the indication information is used for determining the first identification information.

In an implementation, the first paging message is an RAN paging message or a CN paging message.

In an implementation, the first paging message is a CN paging message, and the method further includes: before sending the wake-up message, receiving a second paging message from a CN element, the second paging message indicating the terminal identification information.

In a third aspect, the disclosure provides a communication apparatus. The communication apparatus includes a unit configured to execute the method in the first aspect and any possible implementation thereof, or includes a unit configured to execute the method in the second aspect and any possible implementation thereof.

In a fourth aspect, the disclosure provides a communication apparatus. The communication apparatus includes a processor. The processor is configured to execute the method in the first aspect and any possible implementation thereof, or to execute the method in the second aspect and any possible implementation thereof.

In a fifth aspect, the disclosure provides a communication apparatus. The communication apparatus includes a processor and a memory. The memory is configured to store computer execution instructions. The processor is configured to call program codes from the memory to execute the method in the first aspect and any possible implementation thereof, or to execute the method in the second aspect and any possible implementation thereof. In a sixth aspect, the disclosure provides a chip. The chip is configured to receive a wake-up message, the wake-up message carrying first identification information, and the first identification information being all or part of terminal identification information; and obtain the first identification information from the wake-up message.

In a seventh aspect, the disclosure provides a chip. The chip is configured to obtain first identification information, the first identification information being all or part of terminal identification information; and send a wake-up message, the wake-up message carrying the first identification information.

In an eighth aspect, the disclosure provides a module device. The module device includes a communication module, a power module, a storage module, and a chip module. The power module is configured to provide electrical energy for the module device. The storage module is configured to store data and instructions. The communication module is configured for internal communication of the module device, or for communication between the module device and an external apparatus. The chip module is configured to receive a wake-up message, the wake-up message carrying first identification information, and the first identification information being all or part of terminal identification information; and obtain the first identification information from the wake-up message.

In a ninth aspect, the disclosure provides a module device. The module device includes a communication module, a power module, a storage module, and a chip module. The power module is configured to provide electrical energy for the module device. The storage module is configured to store data and instructions. The communication module is configured for internal communication of the module device, or for communication between the module device and an external apparatus. The chip module is configured to obtain first identification information, the first identification information being all or part of terminal identification information; and send a wake-up message, the wake-up message carrying the first identification information.

The above merely depicts some exemplary implementations of the disclosure, and these exemplary implementations are merely some implementations of the disclosure, which however are not intended to limit the disclosure. All other implementations obtained by those of ordinary skill in the art without creative efforts based on the implementations of the disclosure shall all be encompassed within the protection of the disclosure.

What is claimed is:

1. A method for information transmission, performed by a terminal device and comprising:

receiving a wake-up message; and determining first identification information according to the wake-up message, the first identification information being all or part of terminal identification information;

the method further comprising:

receiving a first paging message, the first paging message carrying second identification information, and the second identification information being all or part of the terminal identification information, wherein the terminal identification information occupies N bits, the second identification information contains values of N2 bits among the N bits, and the N2 bits are the last N2 low bits among the N bits, wherein N2 is a non-negative integer;

obtaining the second identification information from the first paging message; and determining the terminal identification information according to the first identification information and the second identification information.

2. The method of claim 1, wherein the first identification information contains values of N1 bits among the N bits, and the N1 bits are the first N1 high bits among the N bits, wherein N1 is a non-negative integer.

3. The method of claim 1, wherein determining the terminal identification information according to the first identification information and the second identification information comprises:

determining values of the N bits according to values of N1 bits of the first identification information and the values of the N2 bits of the second identification information, wherein N1 and N2 each are a non-negative integer, and N1+N2=N.

4. The method of claim 1, wherein the method further comprises:

receiving configuration information, the configuration information indicating that the first identification information is used for determining values of high bits or low bits among the N bits.

5. The method of claim 1, wherein the wake-up message carries indication information, and determining the first identification information according to the wake-up message comprises:

determining the first identification information according to the indication information and a correspondence between the indication information and the first identification information.

6. The method of claim 1, wherein the first paging message is a radio access network (RAN) paging message or a core network (CN) paging message.

7. The method of claim 1, further comprising:

determining whether to be paged according to the terminal identification information.

8. The method of claim 1, wherein the wake-up message carries the first identification information, and determining the first identification information according to the wake-up message comprises:

obtaining the first identification information from the wake-up message.

9. A communication apparatus, comprising:

a transceiver;

a processor, in communication connection with the transceiver; and a memory, in communication connection with the processor and storing instructions executable by the processor;

the instructions, when executed by the processor, being operable with the processor to:

cause the transceiver to receive a wake-up message; and determine first identification information according to the wake-up message, the first identification information being all or part of terminal identification information;

wherein the transceiver is further configured to:

receive a first paging message, the first paging message carrying second identification information, and the second identification information being all or part of the terminal identification information, wherein the terminal identification information occupies N bits, the second identification information contains values of N2 bits among the N bits, and the N2 bits are the last N2 low bits among the N bits, wherein N2 is a non-negative integer; and wherein the processor is further configured to:

obtain the second identification information from the first paging message; and determine the terminal identification information according to the first identification information and the second identification information.

10. The communication apparatus of claim 9, wherein the processor configured to determine the terminal identification information according to the first identification information and the second identification information is configured to:

determine values of the N bits according to values of N1 bits of the first identification information and the values of the N2 bits of the second identification information, wherein N1 and N2 each are a non-negative integer, and N1+N2=N.

11. The communication apparatus of claim 9, wherein the first identification information contains values of N1 bits among the N bits, and the N1 bits are the first N1 high bits among the N bits, wherein N1 is a non-negative integer.

12. The communication apparatus of claim 9, wherein and the transceiver is further configured to:

receive configuration information, the configuration information indicating that the first identification information is used for determining values of high bits or low bits among the N bits.

13. The communication apparatus of claim 9, wherein the wake-up message carries indication information, and the processor configured to determine the first identification information according to the wake-up message is configured to:

determine the first identification information according to the indication information and a correspondence between the indication information and the first identification information.

14. The communication apparatus of claim 9, wherein the wake-up message carries the first identification information, and the processor configured to determine the first identification information according to the wake-up message is configured to:

obtain the first identification information from the wake-up message.

15. The communication apparatus of claim 9, wherein the processor is further configured to:

determine whether to be paged according to the terminal identification information.

16. A non-transitory computer-readable storage medium storing instructions which, when executed by a processor of a terminal device, cause the processor to carry out actions, comprising:

receiving, with a transceiver of the terminal device, a wake-up message; and determining first identification information according to the wake-up message, the first identification information being all or part of terminal identification information;

wherein the instructions which, when executed by the processor of the terminal device, further cause the processor to carry out actions, comprising:

receiving a first paging message, the first paging message carrying second identification information, and the second identification information being all or part of the terminal identification information, wherein the terminal identification information occupies N bits, the second identification information contains values of N2 bits among the N bits, and the N2 bits are the last N2 low bits among the N bits, wherein N2 is a non-negative integer;

obtaining the second identification information from the first paging message; and determining the terminal identification information according to the first identification information and the second identification information.

* * * * *